April 4, 1967  C. J. JUHNKE ETAL  3,312,844

INDUCTOR ALTERNATOR

Filed Feb. 16, 1965  2 Sheets-Sheet 1

INVENTORS
Charles J. Juhnke
Hans Jakobs
By Mason, Kolehmainen, Rathburn & Wyss
ATTORNEYS April 4, 1967
C. J. JUHNKE ETAL
3,312,844
INDUCTOR ALTERNATOR
Filed Feb. 16, 1965
2 Sheets-Sheet 2
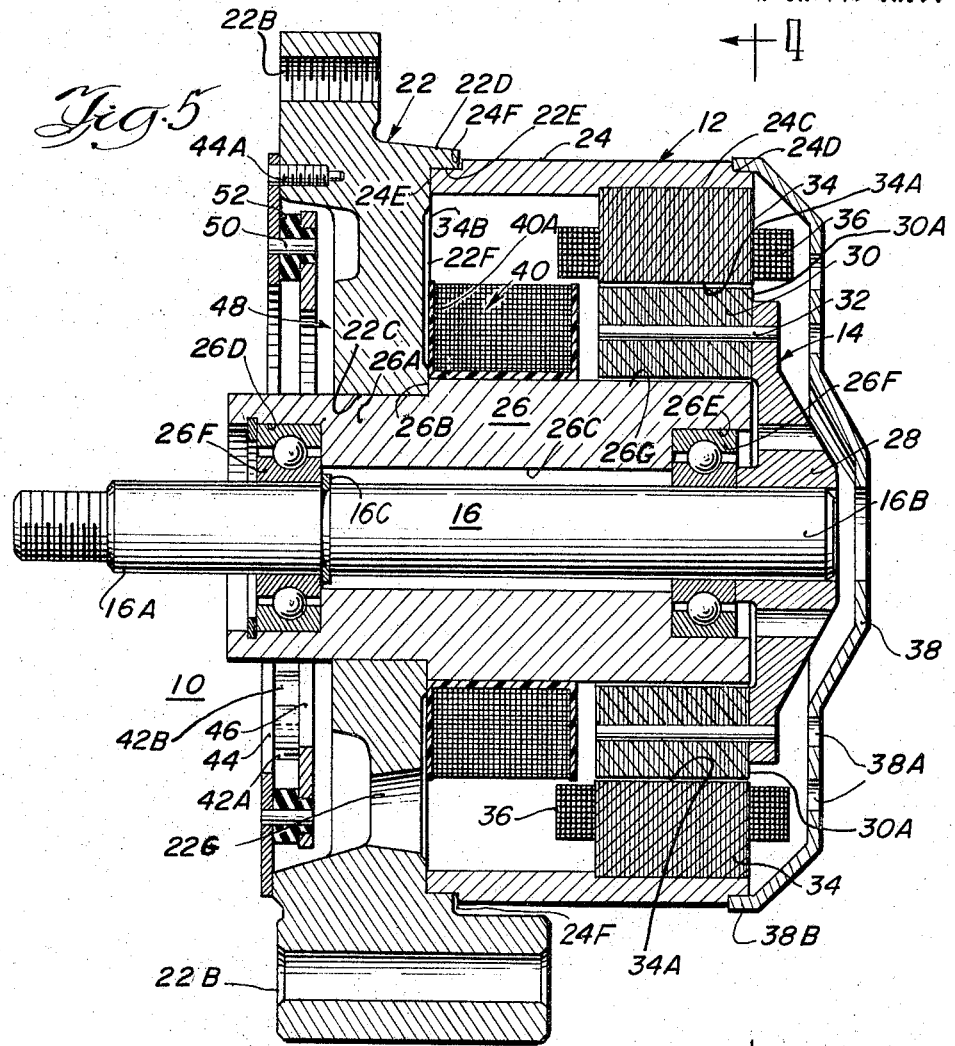
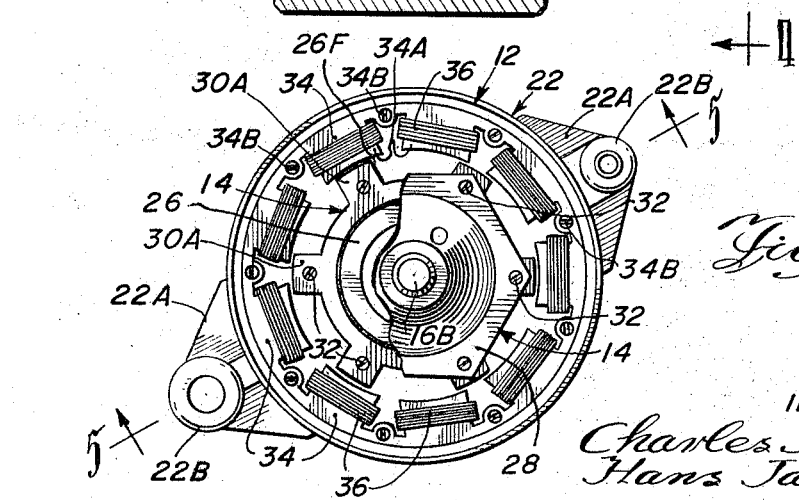
INVENTOR.
Charles J. Juhnke
Hans Jakobs
By Mason, Kolehmainen, Rathburn & Wyss
ATTORNEYS United States Patent Office 3,312,844
Patented Apr. 4, 1967

3,312,844
INDUCTOR ALTERNATOR
Charles J. Juhnke, Deerfield, and Hans Jakobs, Des Plaines, Ill., assignors to C. E. Niehoff & Co., Chicago, Ill., a corporation of Illinois
Filed Feb. 16, 1965, Ser. No. 433,100
5 Claims. (Cl. 310—168)

The present invention relates to electric generating apparatus and, more particularly, to an inductor alternator adapted for use in conjunction with internal combustion engines.

A primary object of the present invention is to provide a new and improved inductor alternator which is of simple yet rugged construction and which can be manufactured simply and economically.

A further object of the present invention is the provision of a new, improved and simplified inductor alternator construction including a multi-part stator having an end plate supporting both an outer casing and an inner elongated tubular support, of which the latter is provided with bearings at its opposite ends for rotatably supporting a rotor shaft extending through it.

Another object of the present invention is the provision of an inductor alternator as set forth in the preceding paragraph in which the elongated tubular support also supports a stationary field coil.

A further object of the present invention is the provision of a new and improved compact inductor alternator construction supporting also diodes for converting the alternating current into a direct current and having a short overall length.

In brief, the inductor alternator of the present invention includes a stator comprising an end plate with a central aperture for the support of a central tubular support for a rotor shaft and having radially outwardly of the aperture and support an outwardly extending flange with its innerside concentric to the aperture for the support of an outer casing. The outer casing has outer annular shoulders at its ends, one of which is fitted inside the aforesaid flange with its end abutting against the side of the plate. The centrally disposed annular elongated tubular support is press fitted into the central aperture in the end plate and it is provided with a shoulder that is abutted against the side of the plate. The outer casing has an elongated counterbore in the end opposite the plate into which stator laminations are fitted. The laminations are bolted to the end plate, whereby the outer casing and laminations are held in assembled relation relative to the plate by the bolts. A stator winding is mounted on the stator laminations and the laminations and winding are spaced from the end plate and from the support. A stationary field winding is mounted on the tubular support adjacent the plate in the space between the latter and the stator laminations and winding. The tubular support has counterbores at its ends for receiving bearings rotatably to support a rotor shaft. A rotor is supported at the end of the shaft opposite the end plate and its includes laminations disposed in the space between the support and the stator laminations. The projecting end of the rotor is enclosed by a second end plate mounted upon the second outer shoulder on the external casing. The end plate supporting the outer casing and the tubular support is also provided with a recess providing space for rectifier diodes and their supporting plates. This arrangement makes the construction compact and provides a shorter overall length.

Other objects and advantages of the present invention will become apparent from the ensuing description of an illustrative embodiment thereof in the course of which reference is had to the accompanying drawings, in which.

Figure 1:
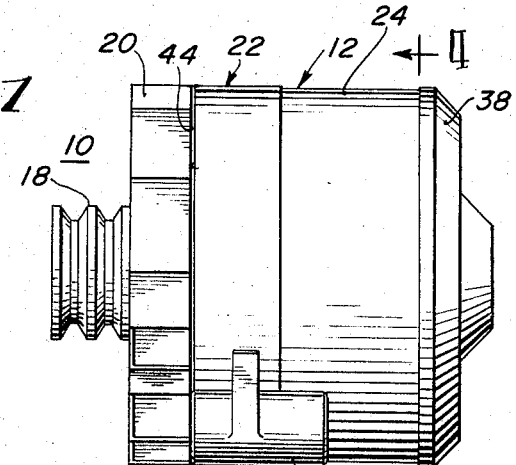
FIG. 1 is a side view of an inductor alternator constructed in accordance with the present invention.
Figure 2:
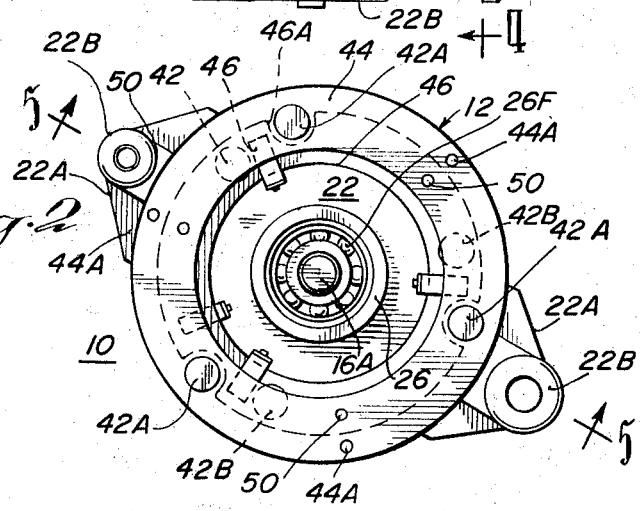
FIG. 2 is an end view of the inductor alternator with a ventilating fan removed.

FIG. 4 is a cross sectional view along the line 4—4 of FIGS. 1 and 5 with part of the rotor element broken away better to illustrate certain details of the present invention; and FIG. 5 is an enlarged axial cross sectional view taken along the line 5—5 of FIGS. 2 and 4, with a driving pulley and fan omitted.

Figure 3:
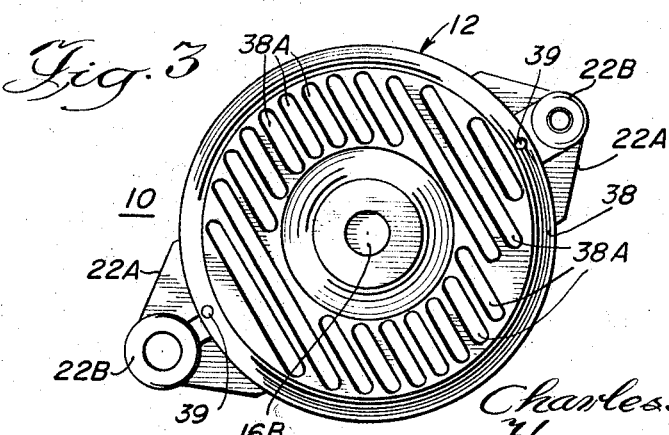
FIG. 3 is an opposite end view of the inductor alternator.

Referring first primarily to FIGS. 1, 2 and 3, the inductor alternator of the present invention is illustrated as a whole by reference character 10. It includes a stator, indicated as a whole by reference character 12, within which is rotatably mounted a rotor, indicated as a whole by reference character 14 and illustrated in FIGS. 4 and 5. The rotor is mounted upon and driven by a shaft 16 having a projecting end 16A upon which is mounted driving means illustrated as a pulley 18, but which might be a gear, by means of which the rotor is driven. Also mounted upon the end 16A of the shaft is a fan element 20 which is diposed exteriorly of the stator 12.

The stator 12 includes, in the main, a relatively heavy generally circular end plate 22 having generally triangular diametrically oppositely located bosses 22A with tubular centrally apertured ribs 22B by means of which the inductor alternator may be suitably mounted relative to an internal combustion engine.

The end plate 22 is provided with a central opening 22C and a radially outwardly disposed flange 22D having an annular inner surface 22E concentrically located relative to the aperture 22C accurately to locate the tubular outer casing 24.

The stator includes also the aforementioned tubular external casing member 24 and a central elongated relatively heavy tubular support 26 having an outer portion 26A of reduced diameter adapted to project through the end plate 22 and to be press fitted into the aperture 22C in the latter. The support 26 is also provided with an annular shoulder 26B adapted to be abutted against a side surface 22F of the end plate located inside of the flange 22D. The construction insures concentricity and accurate location of the various stator parts.

The central tubular support 26 has a central opening 26C through which the rotor shaft 16 extends. The tubular support is provided with counterbores 26D and 26E at its opposite ends for the reception of ball bearing elements 26F rotatably supporting the rotor shaft 16. A retaining ring 16C is provided on the shaft 16 adjacent the forward bearing 26F to prevent the shaft from moving forward relative to the remainder of the alternator. A second end 16B of the shaft projects beyond the right bearing 26F, as shown in FIG. 5, and a rotor plate 28 is attached to this projecting end. The rotor plate is thus located at one end of the tubular support and in the illustrated construction it is hexagonal in configuration, see FIG. 4.

The rotor 14 includes also an axial series of annular laminations 30 secured to the rotor plate 28 as by the rivets 32 or the like. In the illustrated embodiment, the inner sides of the rotor laminations closely encircle the outside 26G of the tubular support. The outer sides of the laminations define a series of six radial outwardly disposed poles 30A, which are disposed to rotate in close proximity to a series of axially disposed stator laminations 34 constructed to define a series of nine inwardly extending poles 34A, each surrounded by a stator winding 36. Other combinations of stator and rotor poles may be used.

The stator laminations are fitted into a counterbore 24C at the outer inside region of the outer stator casing 12. A series of through bolts 34B (shown only in FIG. 4) extend through the laminations and into the end plate 22, thereby to hold the stator laminations in assembled relation to each other and as a whole with respect to the end plate and the stator casing element 24.

The stator casing is effectively closed by an end plate 38 having a series of ventilating openings 38A therein so that air may be drawn, during operation of the inductor alternator, through the openings 38A past the coils and through a series of ventilating openings 22G in the end plate (only one of which is shown in FIG. 5). A short axially extending outer peripheral portion 38B of the end plate 38 is received in a second outer annular shoulder 24D in the external casing 24. The end plate 38 is additionally held as by securing screws 39, see FIG. 3.

The external tubular casing element 24 is supported with accurate concentricity by the flange and particularly the inner annular surface 22E of the end plate. The inner end 24E of the outer casing element is abutted against the inner surface 22F of the end plate and a small space is left at the shoulder region 24F, see FIG. 5.

A stationary field winding 40 is mounted on the outer surface 26G of the tubular support 26 adjacent the surface 22F on end plate 22. The field coil is mounted in a space between the end plate and stator coils and laminations and the rotor laminations, as clearly apparent from FIG. 5. The coil 40 may be conveniently wound as upon a bobbin 40A having a central portion adapted closely to fit around the tubular support 26.

In accordance with known principles, the field coil 40 is supplied with direct current to produce a magnetic flux flowing in a path including the tubular support, the end plate 22, the outer casing 24, the stator laminations 34, and through the rotating rotor laminations 30 back to the tubular support. As a result, an alternating current voltage is generating in the coils 36 which may, for example, be connected in three phase-Y relationship. It has been found that good results are achieved with a rotor having six poles 30A and a stator having nine poles 34A, each stator pole having a winding and in which the windings are connected in Y relationship.

The alternating current generated in the windings 36 is supplied to a series of diode rectifiers 42 supported by a pair of axially spaced apertured heat sink defining plates 44 and 46, of which the latter is supported in a recess 48 formed in the left side of the end plate 22, as noted in FIG. 5. For convenience, the outer plate 44 is supported upon and in electrical contact and thus grounded to plate 22 as by a series of screws 44A and the inner plate 46 is supported from plate 44 by the rivets 50 and associated insulating spacers 52, as best illustrated in FIG. 5. Three of the rectifier diodes, i.e., the diodes 42A are mounted upon the grounded plate 44 and the other three 42B are mounted upon the ungrounded plate 46. They are electrically connected to the windings 36 and battery (not shown) in known manner.

From the foregoing detailed description of the present invention it may be noted that the inductor alternator may be constructed from relatively few easily machined parts that can be machined very accurately and which can be assembled readily and within close dimensional tolerances. No brushes or commutator are required and the connections to the field coil 40, as well as to the stator coils 36, can be made simply and easily. As a result, the inductor alternator can be made and assembled economically and it is rugged in construction and substantially free of operating difficulties in use with internal combustion engines.

The drive or pulley end of the inductor alternator, which end also includes the primary end plate 22, is generally located at the front of the automotive vehicle. This arrangement and the one in which the diodes are mounted in the recess 48 at the front end provides for a shorter overall length of the device and thus makes it more compact. Also, location of the diodes at the indicated position in which they are cooled by air having traveled through the inductor alternator has the advantage that the air is filtered to some extent prior to the time that it reaches the diodes. As a result, the diodes are less likely to be contaminated by foreign particles and material, such as salt or the like.

While the present invention has been described and illustrated in connection with the details of an illustrative embodiment thereof, it should be understood that these details are not intended to be limitative of the invention except insofar as set forth in the accompanying claims.

What is claimed as new and desired to be secured by Letters Patent of the United States is:

1. An inductor alternator, including in combination, a stator including a centrally apertured end plate, an outer tubular casing carried by said plate, an elongated tubular support having an end mounted in the aperture in said end plate, stator laminations and a stator winding mounted within the end of said casing opposite the end plate, said laminations being spaced from the end plate and from the support, and a stationary field winding mounted on said support adjacent said plate in the space between the plate and the stator winding and laminations, a rotor shaft extending through said support, bearings at the opposite ends of said support rotatably supporting said shaft, and a rotor supported at the end of said shaft opposite the end plate and including laminations in the space between the support and stator laminations.

2. An inductor alternator, including in combination, a stator including a centrally apertured end plate, an elongated tubular support having an end mounted in the aperture in said end plate, a stationary field winding mounted on said support immediately adjacent said plate, a rotor shaft extending through said support, bearings at the opposite ends of said support rotatably supporting said shaft, and a rotor supported at the end of said shaft opposite the end plate.

3. An inductor alternator, including in combination, a stator including an end plate with a circular central aperture, an outer tubular casing carried by said plate concentrically relative to the aperture and having a counterbore at its end opposite the plate, an elongated tubular support having a circular end mounted in the aperture in said end plate, stator laminations mounted within the counterbore, said laminations being spaced from the end plate and from the support, and a stationary field winding mounted on said support adjacent said plate in the space between the plate and the stator winding and laminations, a rotor shaft extending through said support, bearings at the opposite ends of said support rotatably supporting said shaft, and a rotor supported at the end of said shaft opposite the end plate and including laminations in the space between the support and stator laminations.

4. An inductor alternator, including in combination, a stator including an end plate with a central aperture and having outwardly of the aperture an axially extending flange with its inner side concentric to the aperture, an outer tubular casing carried by said plate having annular external shoulders at its ends of which one is fitted inside the flange with the end of the casing abutting against the side of the plate, an elongated tubular support having an end press fitted into the aperture in said end plate and having an annular shoulder abutted against a side of the plate, said casing having an elongated counterbore at the end opposite the plate, stator laminations fitted into the counterbore in said casing and bolted to the end plate thereby to hold the casing assembled to the plate and the laminations to the casing, a stator winding mounted on said stator laminations, said laminations and winding being spaced axially from the end plate and radially from the support, and a stationary field winding mounted on said tubular support adjacent said plate in the axial space between the plate and the stator winding and laminations, a rotor shaft extending through said support, said tubular support having counterbores at its ends, bearings in the counterbores in said support rotatably supporting said shaft, a rotor supported at the end of said shaft opposite the end plate and including laminations in the radial space between the support and stator laminations, and a second end plate secured onto the external shoulder on the end of the casing opposite the first end plate.

5. An inductor alternator, including in combination, a stator including an end plate with a central aperture having a circular recess on its front side and having at its rear side outwardly of the aperture an axially extending flange with its inner side concentric to the aperture, an outer tubular casing carried by said plate having annular external shoulders at its ends of which one is fitted inside the flange with the end of the casing abutting against the side of the plate, an elongated tubular support having an end press fitted into the aperture against a side of the plate, said casing having an elongated counterbore at the end opposite the plate, stator laminations fitted into the counterbore in said casing and bolted to the end plate thereby to hold the casing assembled to the plate and the laminations to the casing, a stator winding mounted on said stator laminations, said laminations and winding being spaced axially from the end plate and radially from the support, and a stationary field winding mounted on said tubular support adjacent said plate in the axial space between the plate and the stator winding and laminations, a rotor shaft extending through said support, said tubular support having counterbores at its ends, bearings in the counterbores in said support rotatably supporting said shaft, a rotor supported at the end of said shaft opposite the end plate and including laminations in the radial space between the support and stator laminations, and a second end plate with ventilation openings secured onto the external shoulder on the end of the casing opposite the first end plate, the first end plate having ventilation openings, and a fan mounted on said shaft adjacent said plate and rectifiers, and rectifier diodes supported in said recess at the front side of said first mentioned end plate.

References Cited by the Examiner

UNITED STATES PATENTS 2,774,895  12/1956  Zuckermann _____ 310—266

MILTON O. HIRSHFIELD, *Primary Examiner.*

L. L. SMITH, *Assistant Examiner.*